US012468409B1

(12) United States Patent
Chen et al.

(10) Patent No.: US 12,468,409 B1
(45) Date of Patent: Nov. 11, 2025

(54) FULL-AREA TOUCH DEVICE

(71) Applicant: SUNREX TECHNOLOGY CORP., Taichung (TW)

(72) Inventors: Chun-Chieh Chen, Taichung (TW); Ching-Yao Huang, Taichung (TW); Ling-Cheng Tseng, Taichung (TW); Yi-Wen Tsai, Taichung (TW); Cheng-Yu Chuang, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 18/947,600

(22) Filed: Nov. 14, 2024

(30) Foreign Application Priority Data

Jun. 21, 2024 (TW) ................................. 113206591

(51) Int. Cl.
*G06F 3/041* (2006.01)
*G06F 3/0354* (2013.01)

(52) U.S. Cl.
CPC ............................... *G06F 3/03547* (2013.01)

(58) Field of Classification Search
CPC .... G06F 1/169; G06F 3/0354; G06F 3/03547; G06F 3/041; G06F 3/0414; G06F 2203/04105; G06F 2203/04108
See application file for complete search history.

(56) References Cited

U.S. PATENT DOCUMENTS

| | | | | |
|---|---|---|---|---|
| 11,340,719 | B1 * | 5/2022 | Lin | G06F 3/03547 |
| 12,242,677 | B1 * | 3/2025 | Chen | G06F 3/03547 |
| 12,321,541 | B2 * | 6/2025 | Chen | G06F 3/03547 |
| 12,393,290 | B1 * | 8/2025 | Chen | G06F 3/03547 |
| 2012/0103773 | A1 * | 5/2012 | Villain | G06F 3/03547 |
| | | | | 200/344 |
| 2015/0243457 | A1 * | 8/2015 | Niu | H01H 13/46 |
| | | | | 156/247 |
| 2019/0243475 | A1 * | 8/2019 | Huang | G06F 1/1681 |
| 2019/0243476 | A1 * | 8/2019 | Chen | H01H 3/122 |
| 2019/0391656 | A1 * | 12/2019 | Togawa | G06F 3/042 |
| 2021/0263556 | A1 * | 8/2021 | Degner | G06F 3/04883 |
| 2022/0066580 | A1 * | 3/2022 | Lin | G06F 3/03547 |

* cited by examiner

*Primary Examiner* — Joe H Cheng
(74) *Attorney, Agent, or Firm* — Thomas Horstemeyer, LLP (57) ABSTRACT

A full-area touch device includes a bottom plate including a bottom plate periphery, a touch unit, a resilient unit, and a supporting unit. The touch unit is disposed above the bottom plate, and includes a touch pad, a circuit board, and a pushbutton switch disposed on the circuit board. The resilient unit includes a positioning region, a peripheral edge surrounding the positioning region, and a connecting frame subunit and a slot region disposed and located between the positioning region and the peripheral edge. The slot region has a contour greater than that of the bottom plate periphery. The slot region surrounds the positioning region. The connecting frame subunit is bent relative to the positioning region when the touch unit is pressed. The supporting unit includes a fixing frame subunit and supporting members connected to the fixing frame subunit and extending across the slot region.

10 Claims, 12 Drawing Sheets

FIG. 12 ing device,

FULL-AREA TOUCH DEVICE

CROSS-REFERENCE TO RELATED APPLICATION

This application claims priority to Taiwanese Utility Model Patent Application No. 113206591, filed on Jun. 21, 2024, the entire disclosure of which is incorporated by reference herein.

FIELD

The disclosure relates to an electronic inputting device, and more particularly to a full-area touch device.

BACKGROUND

A conventional touch pad module (as disclosed in Taiwanese Invention Patent Certificate No. I714036) adapted for an electronic device, includes an alloy supporting structure, a metal resilient sheet, a metal plate, a metal limiting portion, and a circuit board. The metal resilient sheet and the metal plate are respectively connected to two opposite surfaces of a bending portion of the alloy supporting structure. The metal limiting portion extends through the bending portion to interconnect the metal resilient sheet and the metal plate. The circuit board is disposed on the metal resilient sheet. A positioning portion of the metal plate extends through a positioning opening of the bending portion and engages a housing of the electronic device.

Although the conventional touch pad module can achieve the desired purpose of use, most components thereof, such as the alloy supporting structure, the metal resilient sheet, the metal plate, the metal limiting portion, etc., are made of a metal material, which causes an overall weight of the conventional touch pad module to be heavy and manufacturing cost thereof to increase.

SUMMARY

Therefore, an object of the disclosure is to provide a full-area touch device that can alleviate at least one of the drawbacks of the prior art.

According to the disclosure, the full-area touch device includes a bottom plate, a touch unit, a resilient unit, and a supporting unit. The bottom plate includes a bottom plate periphery. The touch unit is disposed above the bottom plate along an axis, and includes a touch pad, a circuit board that is connected to a bottom side of the touch pad, and a pushbutton switch that is disposed on a bottom side of the circuit board. The resilient unit is in a shape of a plate, is disposed between the bottom plate and the circuit board, and includes a positioning region that is connected to the bottom plate, a peripheral edge that surrounds a periphery of the positioning region, a connecting frame subunit that is disposed between the positioning region and the peripheral edge, and a slot region that is located between the positioning region and the peripheral edge. The slot region has a contour that is greater than a contour of the bottom plate periphery. The slot region surrounds the positioning region. The connecting frame subunit is in a shape of a surrounding frame and is positioned with respect to the circuit board. When the touch unit is pressed toward the bottom plate, the connecting frame subunit is pushed by the touch unit such that the resilient unit is resiliently deformed and that the connecting frame subunit is bent relative to the positioning region. The supporting unit is in a shape of a surrounding frame, is connected to the resilient unit and positioned with respect to the circuit board, and includes a fixing frame subunit that is connected to the connecting frame subunit, and a plurality of supporting members that are connected to the fixing frame subunit. Each of the supporting members extends across the slot region.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
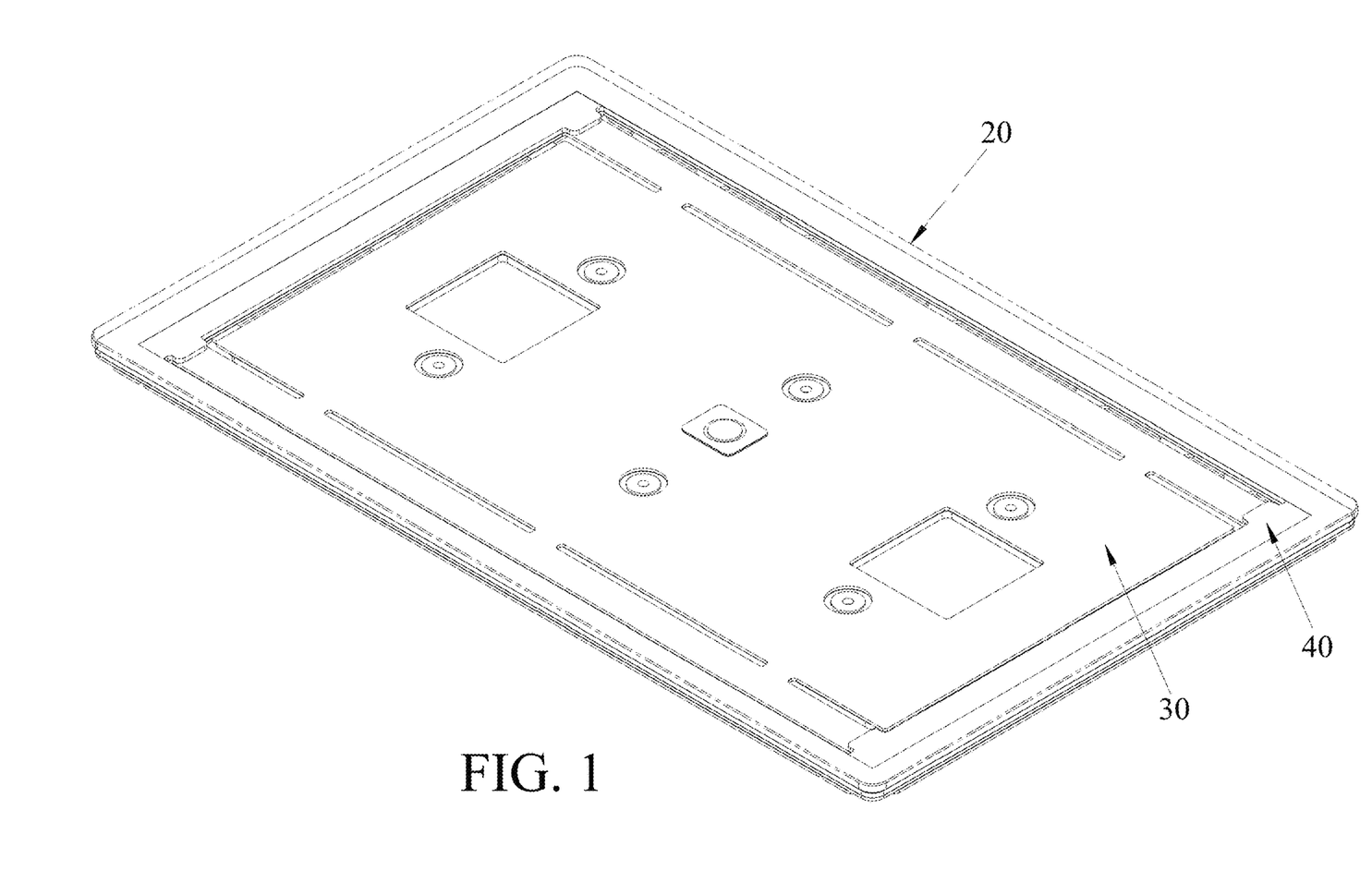
FIG. 1 is a schematic perspective view of an embodiment of a full-area touch device according to the disclosure.
Figure 2:
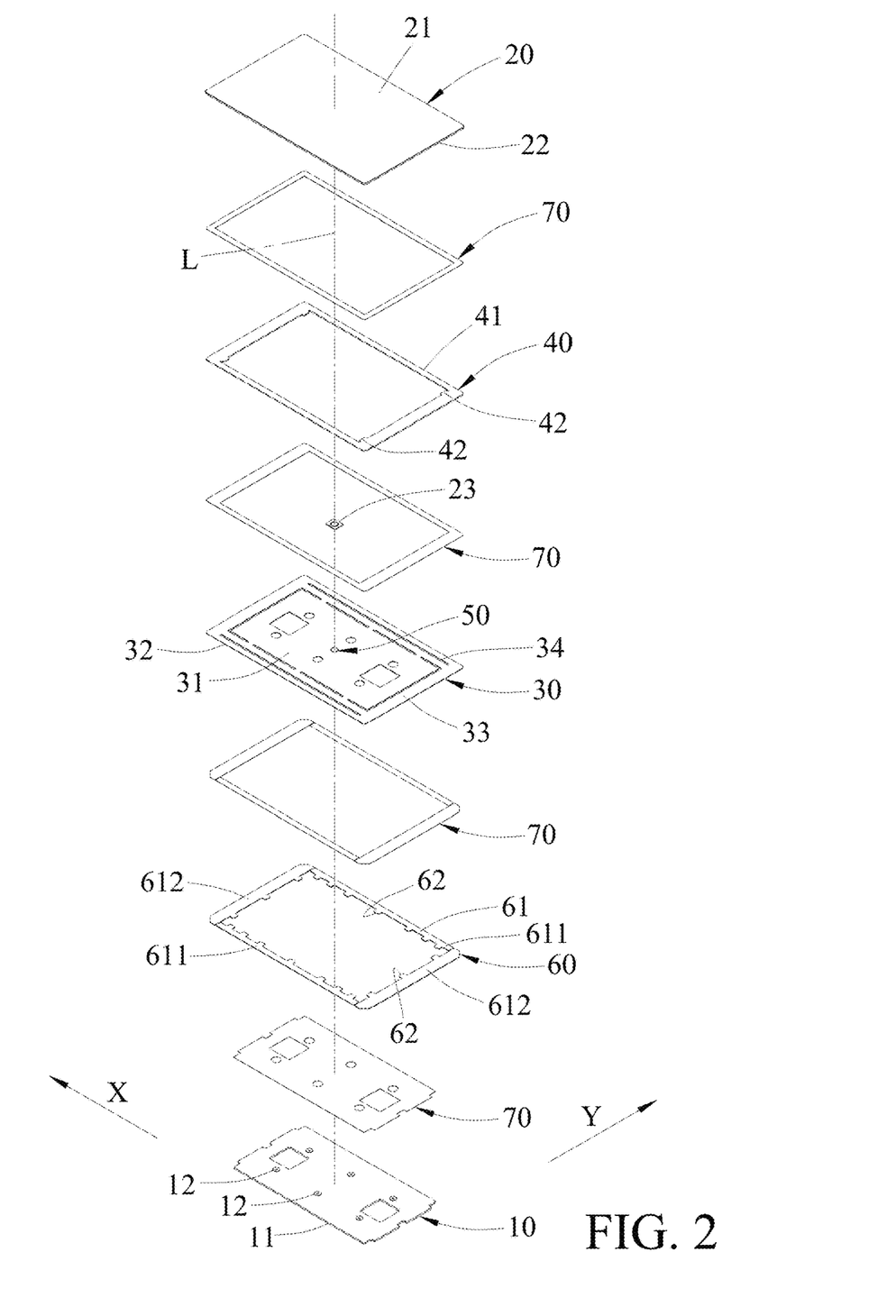
FIG. 2 is an exploded perspective view of the embodiment.

Referring to FIGS. 1 and 2, an embodiment of a full-area touch device according to the disclosure includes a bottom plate 10, a touch unit 20, a resilient unit 30, an abutting plate 40, a pressing member 50, a supporting unit 60 and a plurality of adhesives 70.

The bottom plate 10 is made of a metal material, is substantially in a shape of a rectangle, and includes a bottom plate periphery 11 and a plurality of threaded holes 12. The bottom plate 10 may be fixed to a housing of a laptop computer (not shown) through screws (not shown) that threadedly engage the threaded holes 12 and the housing.

The touch unit 20 is disposed above the bottom plate 10 along an axis (L), and includes a touch pad 21, a circuit board 22 connected to a bottom side of the touch pad 21, and a pushbutton switch 23 disposed on a bottom side of the circuit board 22. Specifically, in this embodiment, the pushbutton switch 23 is disposed on a center of the bottom side of the circuit board 22. The touch pad 21 may be made of a glass material.

Figure 3:
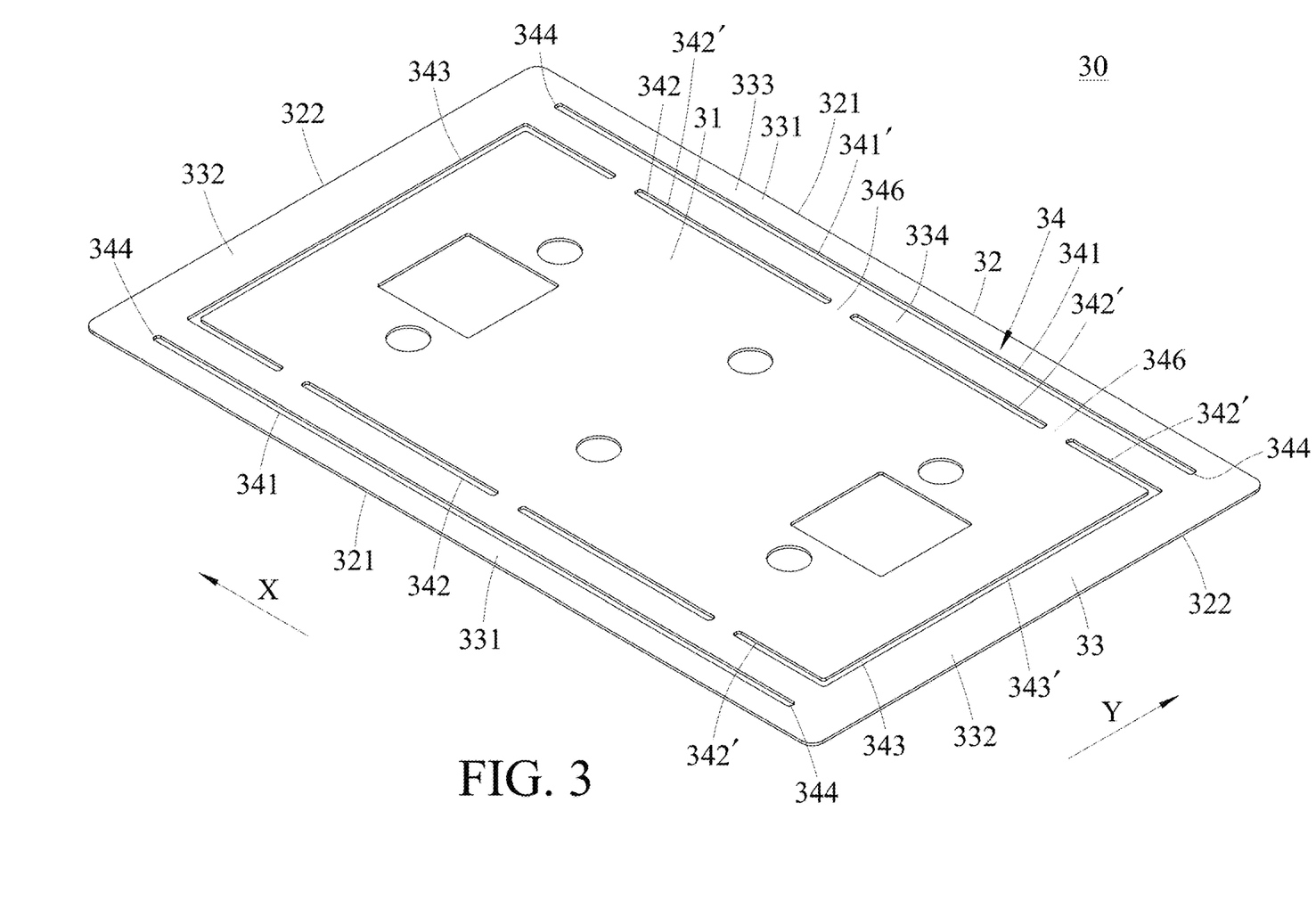
FIG. 3 is a perspective view illustrating a resilient unit of the embodiment.

Referring to FIG. 3 with reference to FIGS. 1 and 2, the resilient unit 30 is in a shape of a thin plate, is disposed between the bottom plate 10 and the circuit board 22, and includes a positioning region 31 that is connected to the bottom plate 10 through one of the adhesives 70, a peripheral edge 32 that surrounds a periphery of the positioning region 31, a connecting frame subunit 33 that is disposed between the positioning region 31 and the peripheral edge 32 and that is positioned with respect to the circuit board 22, and a slot region 34 that is located between the positioning region 31 and the peripheral edge 32 (specifically, in this embodiment, a portion of the slot region 34 is located on the connecting frame subunit 33). The resilient unit 30 may be made of one of a plastic material, a metal material, a glass fiber material, and a carbon fiber material; in this embodiment, the resilient unit 30 is made of a plastic material.

The peripheral edge 32 has two first lateral sides 321 that extend in a horizontal direction (X) perpendicular to the axis (L), and two second lateral sides 322 that extend in a longitudinal direction (Y) perpendicular to the horizontal direction (X) and the axis (L). Each of the second lateral sides 322 interconnects the first lateral sides 321.

The connecting frame subunit 33 is in a shape of a surrounding frame and is connected to the abutting plate 40 through one of the adhesives 70 that is in a shape of a rectangular frame. The abutting plate 40 is disposed between the circuit board 22 and the resilient unit 30; specifically, the abutting plate 40 is connected to the bottom side of the circuit board 22 through another one of the adhesives 70 that is in a shape of a rectangular frame. The connecting frame subunit 33 has two first frame rods 331 that are respectively adjacent to the first lateral sides 321 and that extend in the horizontal direction (X), and two second frame rods 332 that are respectively adjacent to the second lateral sides 322 and that extend in the longitudinal direction (Y). Each of the second frame rods 332 interconnects the first frame rods 331.

The slot region 34 has a contour that is greater than a contour of the bottom plate periphery 11 on an imaginary plane defined by the horizontal and longitudinal directions (X, Y) of the full-area touch device, and the slot region 34 surrounds the periphery of the positioning region 31. The slot region 34 has two outer horizontal slot subregions 341 that are respectively located on the first frame rods 331 of the connecting frame subunit 33 and that are located between the first lateral sides 321, two inner horizontal slot subregions 342 that are located between the outer horizontal slot subregions 341, and two longitudinal slot subregions 343 which are respectively adjacent to the second frame rods 332 and each of which is in located between the positioning region 31 and the respective one of the second frame rods 332. Each of the outer horizontal slot subregions 341 has at least one outer horizontal slot 341' that extends in the horizontal direction (X). The at least one outer horizontal slot 341' of each of the outer horizontal slot subregions 341 has two slot ends 344 that are respectively adjacent to the second frame rods 332, and the two slot ends 344 are in spatial communication with each other. Each of the inner horizontal slot subregions 342 has a plurality of inner horizontal slots 342' that are spaced apart from each other in the horizontal direction (X). The slot region 34 further includes a plurality of spacer sections 346 which are connected to the positioning region 31 and each of which is formed between two adjacent ones of the inner horizontal slots 342' of the inner horizontal slot subregions 342. Each of the spacer sections 346 has a width in the horizontal direction (X) and a thickness, and the width and the thickness of each of the spacer sections 346 may be designed in various sizes, depending on actual needs. In this embodiment, the width of each of the spacer sections 346 ranges from 3 millimeters (mm) to 10 mm, and the thickness of each of the spacer sections 346 ranges from 0.3 mm to 0.8 mm. When the touch pad 21 is pressed, a downward force is exerted thereon so as to trigger the pushbutton switch 23; a magnitude of the downward force to trigger the pushbutton switch 23 is affected by the width and the thickness of each of the spacer sections 346; that is, by modification of the width and the thickness of each of the spacer sections 346, the magnitude of the downward force to trigger the pushbutton switch 23 is adjustable. Each of the longitudinal slot subregions 343 has a longitudinal slot 343' that extends in the longitudinal direction (Y), and that is in spatial communication with one of the inner horizontal slots 342' of each of the inner horizontal slot subregions 342.

Each of the first frame rods 331 has an outer resilient arm 333 that is located between the respective one of the first lateral sides 321 and the respective one of the outer horizontal slot subregions 341, and an inner resilient arm 334 that is located between the respective one of the outer horizontal slot subregions 341 and a respective one of the inner horizontal slot subregions 342. The outer resilient arm 333 of each of the first frame rods 331 has a width in the longitudinal direction (Y), and a thickness, and the width and the thickness of the outer resilient arm 333 may be designed in various sizes; the magnitude of the downward force to trigger the pushbutton switch 23 is affected by the widths and the thicknesses of the outer resilient arms 333; that is, by modification of the widths and the thicknesses thereof, the magnitude of the downward force to trigger the pushbutton switch 23 is adjustable. In this embodiment, the width of the outer resilient arm 333 of each of the first frame rods 331 ranges from 3 mm to 12 mm, and the thickness of the outer resilient arm 333 ranges from 0.3 mm to 0.8 mm.

The positioning region 31 is located at inner sides of the inner horizontal slot subregions 342 and inner sides of the longitudinal slot sets 343 (i.e., the positioning region 31 is surrounded by the inner horizontal slots 342' and the longitudinal slots 343'). In this embodiment, one outer horizontal slot subregion 341 and one inner horizontal slot subregion 342 are provided on the inner side of each of the first lateral sides 321, but in other embodiments, a number of the outer horizontal slot subregion 341 or the inner horizontal slot subregion 342 provided on the inner side of each of the first lateral sides 321 may be more than one.

Figure 6:
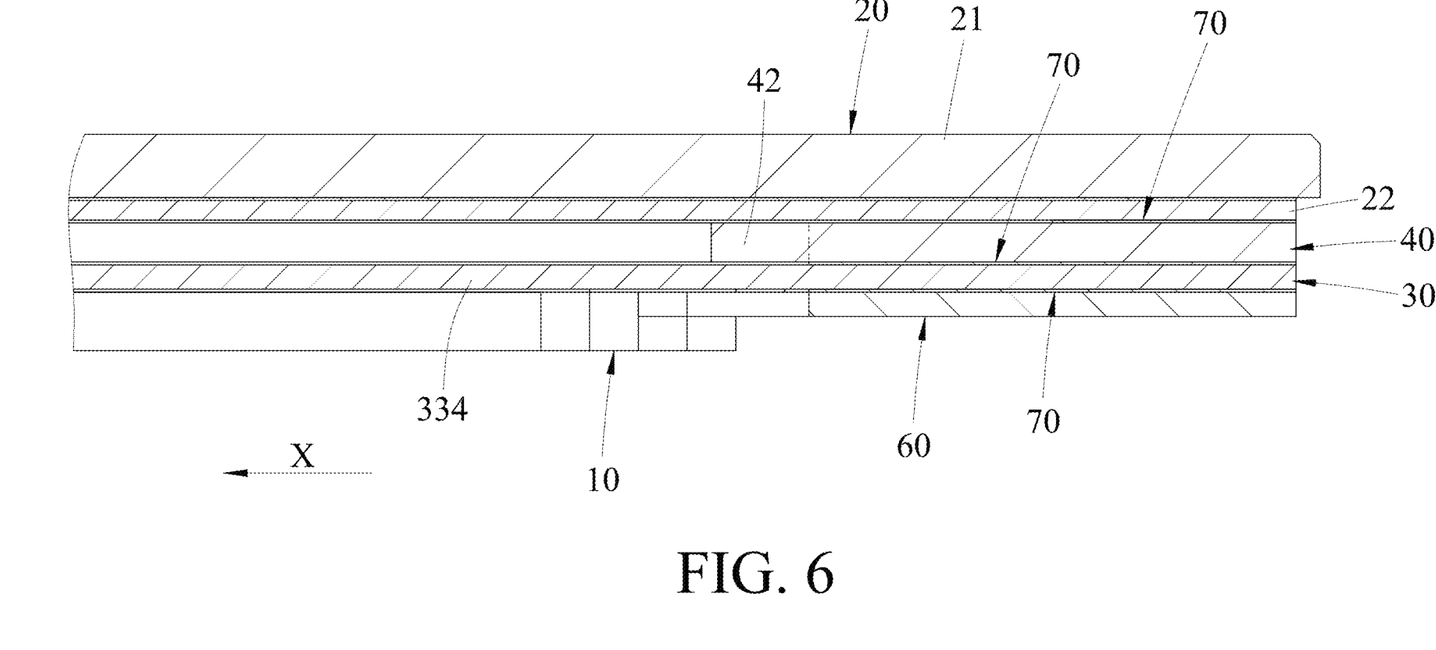
FIG. 6 is a fragmentary enlarged view of FIG. 5.
Figure 7:
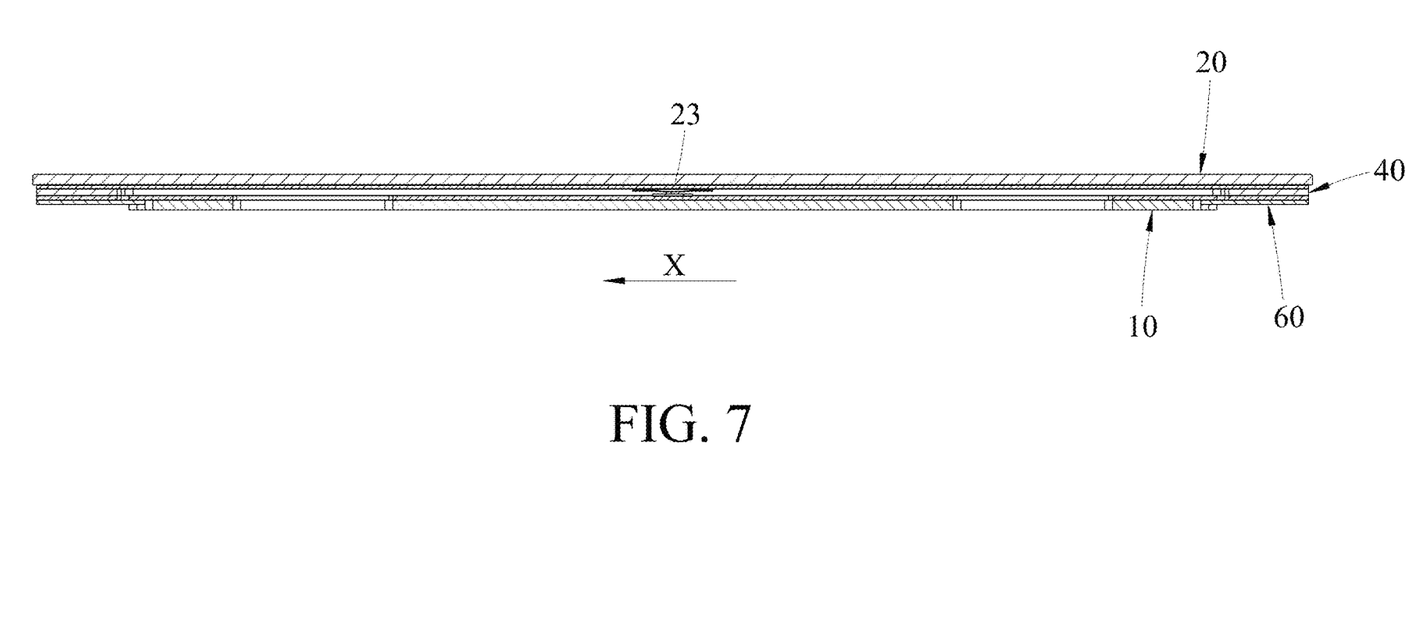
FIG. 7 is a sectional view taken along line VII-VII in FIG. 4.

The abutting plate 40 includes a positioning frame 41 that is clamped between the circuit board 22 and the connecting frame subunit 33, and a plurality of abutting members 42 (see FIG. 4) that are connected to the positioning frame 41 and that abut against the first frame rods 331 (specifically, a portion of the abutting members 42 abut against the inner resilient arm 334 of one of the first frame rods 331 and another portion of the abutting members 42 abut against the inner resilient arm 334 of another one of the first frame rods 331) (see FIG. 6).

The pressing member 50 is disposed on a center of the positioning region 31 of the resilient unit 30, and corresponds in position to the pushbutton switch 23.

Figure 4:
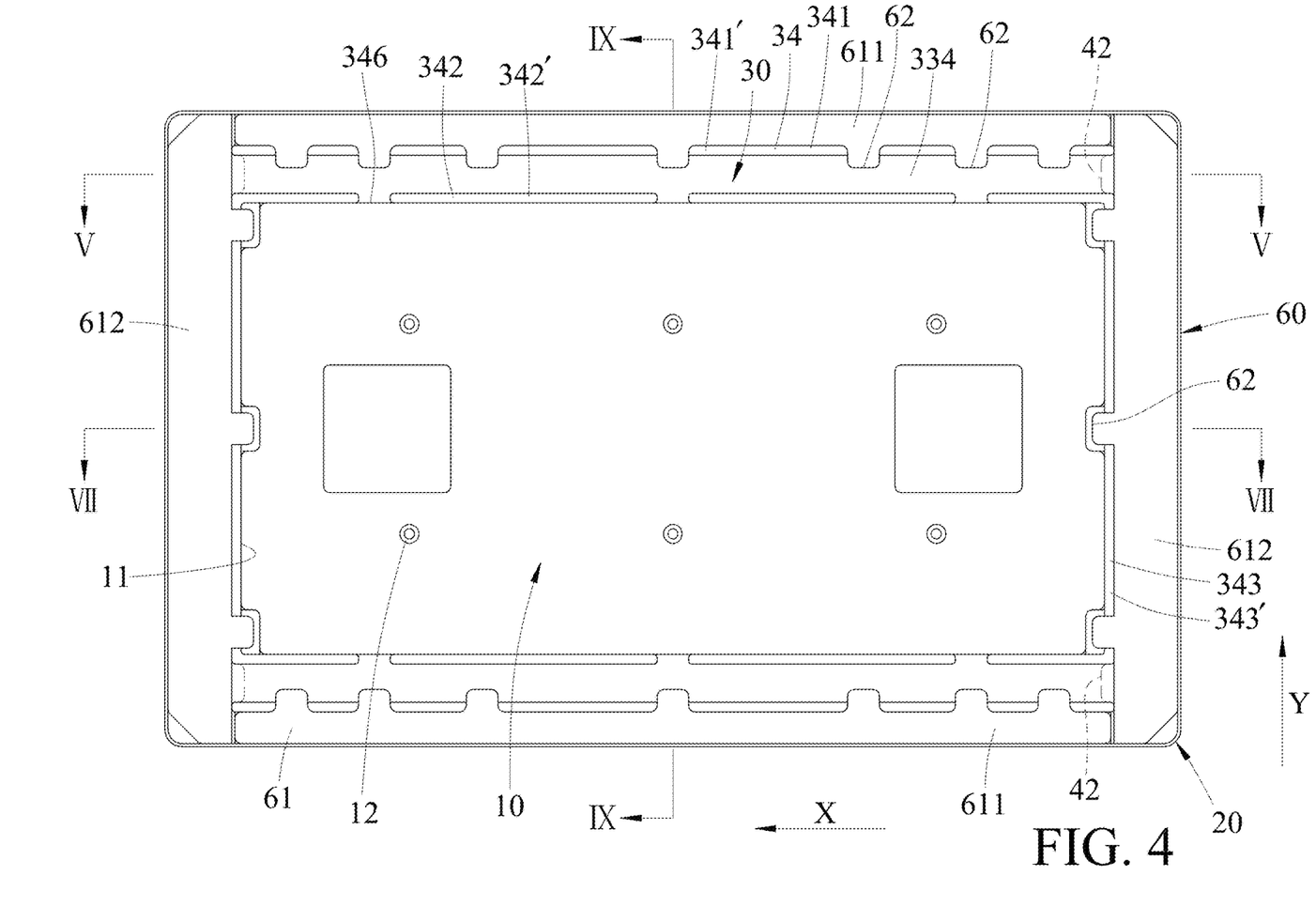
FIG. 4 is a bottom view of the embodiment.
Figure 5:
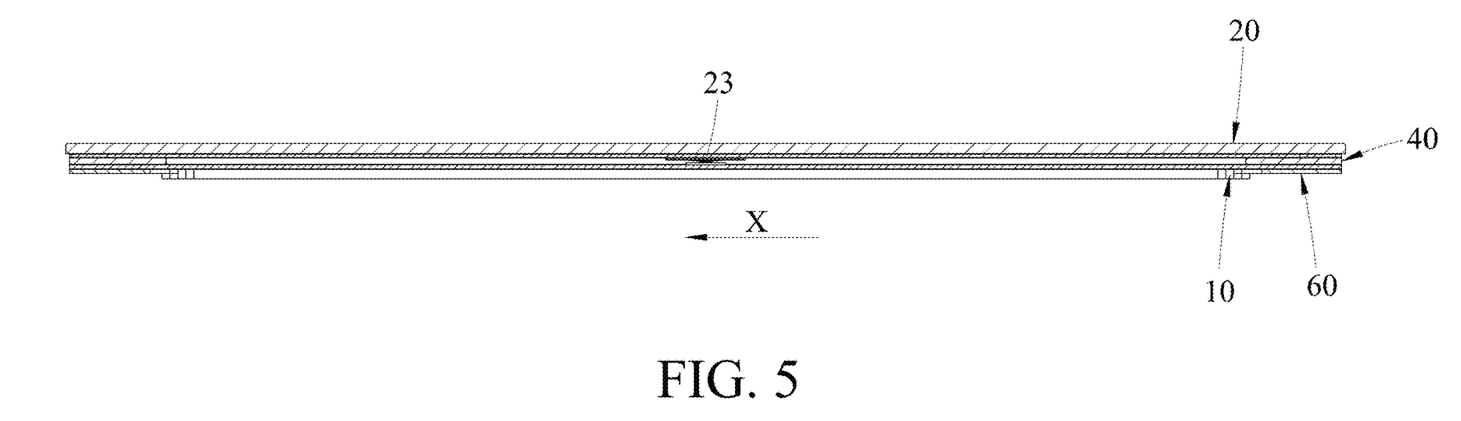
FIG. 5 is a sectional view taken along line V-V in FIG. 4.

Referring to FIGS. 4 to 6, the supporting unit 60 is in a shape of a surrounding frame, is connected to a bottom side of the resilient unit 30 through another one of the adhesives 70, and is positioned with respect to the circuit board 22. The supporting unit 60 includes a fixing frame subunit 61 that is connected to the connecting frame subunit 33 (see FIG. 10), and a plurality of supporting members 62 that are connected to the fixing frame subunit 61. Each of the supporting members 62 extends across the slot region 34. The fixing frame set 61 includes two horizontal frame plates 611 that extend in the horizontal direction (X) and that are respectively fixed to bottom surfaces of the outer resilient arms 333, and two longitudinal frame plates 612 that extend in the longitudinal direction (Y) and that are respectively fixed to bottom surfaces of the second frame rods 332. In this embodiment, the horizontal frame plates 611 and the longitudinal frame plates 612 are separately formed, and the supporting members 62 are connected to the horizontal frame plates 611 and the longitudinal frame plates 612 (specifically, a portion of the supporting members 62 are connected to the horizontal frame plates 611 and another portion of the supporting members 62 are connected to the longitudinal frame plates 612). However, in practice, the fixing frame subunit 61 may be integrally formed (i.e., be made as a one-piece closed surrounding frame), and the horizontal frame plates 611 and the longitudinal frame plates 612 are connected to each other. By virtue of the horizontal frame plates 611 and the longitudinal frame plates 612 being separated from each other, wastes generated in the manufacturing process of the full-area touch device may be reduced.

For the supporting members 62 connected to the horizontal frame plates 611, the supporting members 62 connected to one of the horizontal frame plates 611 extend toward another one of the horizontal frame plates 611, and the supporting members 62 connected to the another one of the horizontal frame plates 611 extend toward the one of the horizontal frame plates 611; the supporting members 62 connected to the horizontal frame plates 611 extend across the outer horizontal slot subregions 341. For the supporting members 62 connected to the longitudinal frame plates 612, the supporting members 62 connected to one of the longitudinal frame plates 612 extend toward another one of the longitudinal frame plates 612, and the supporting members 62 connected to the another one of the longitudinal frame plates 612 extend toward the one of the longitudinal frame plates 612; the supporting members 62 connected to the longitudinal frame plates 612 extend across the longitudinal slot subregions 343 (see FIGS. 4 and 7 to 10).

The following description may be helpful in further understanding the generated effects of the components of the disclosure, the technical methods that are utilized, and the objective that is expected to be achieved.

Figure 8:
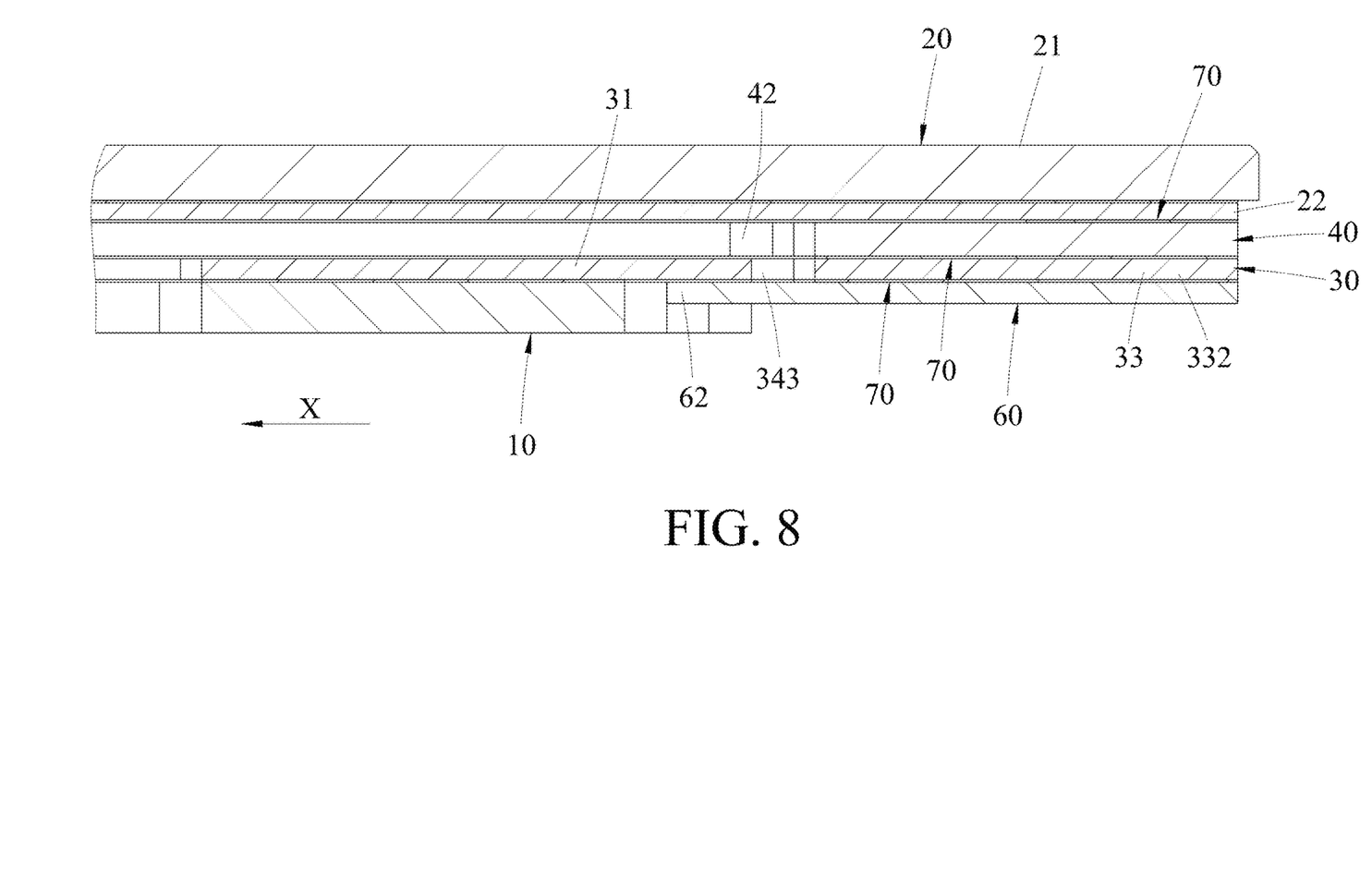
FIG. 8 is a fragmentary enlarged view of FIG. 7.
Figure 9:
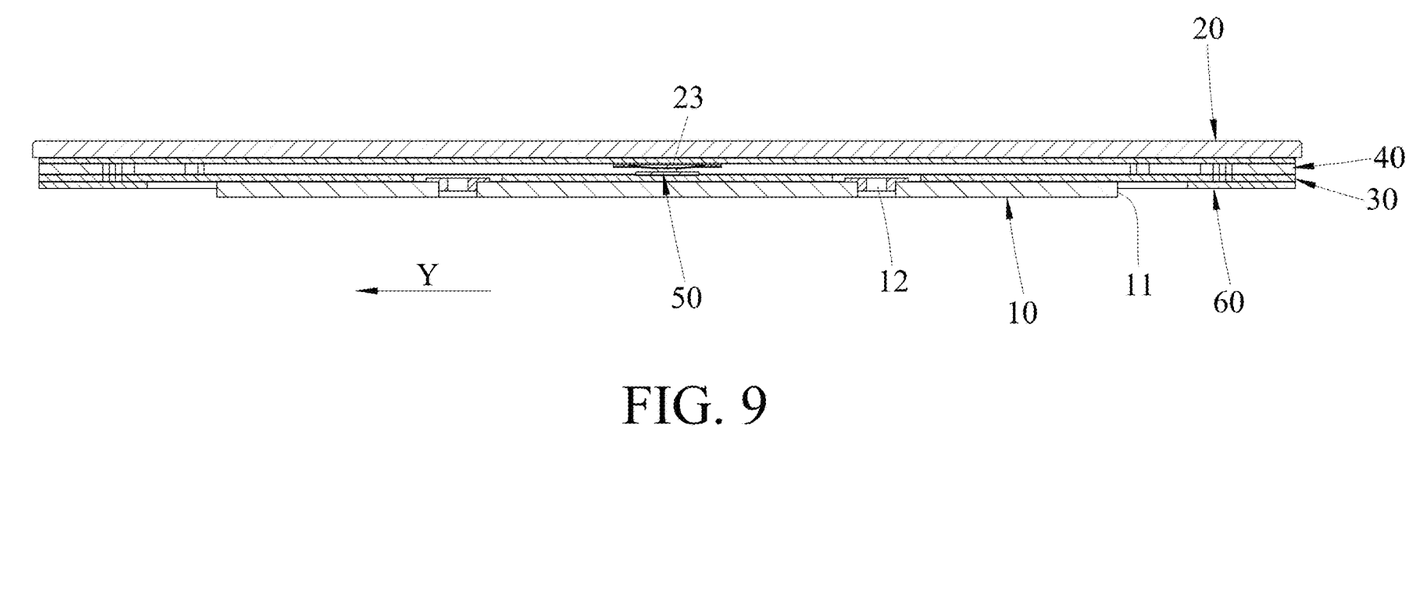
FIG. 9 is a sectional view taken along line IX-IX in FIG. 4.
Figure 10:
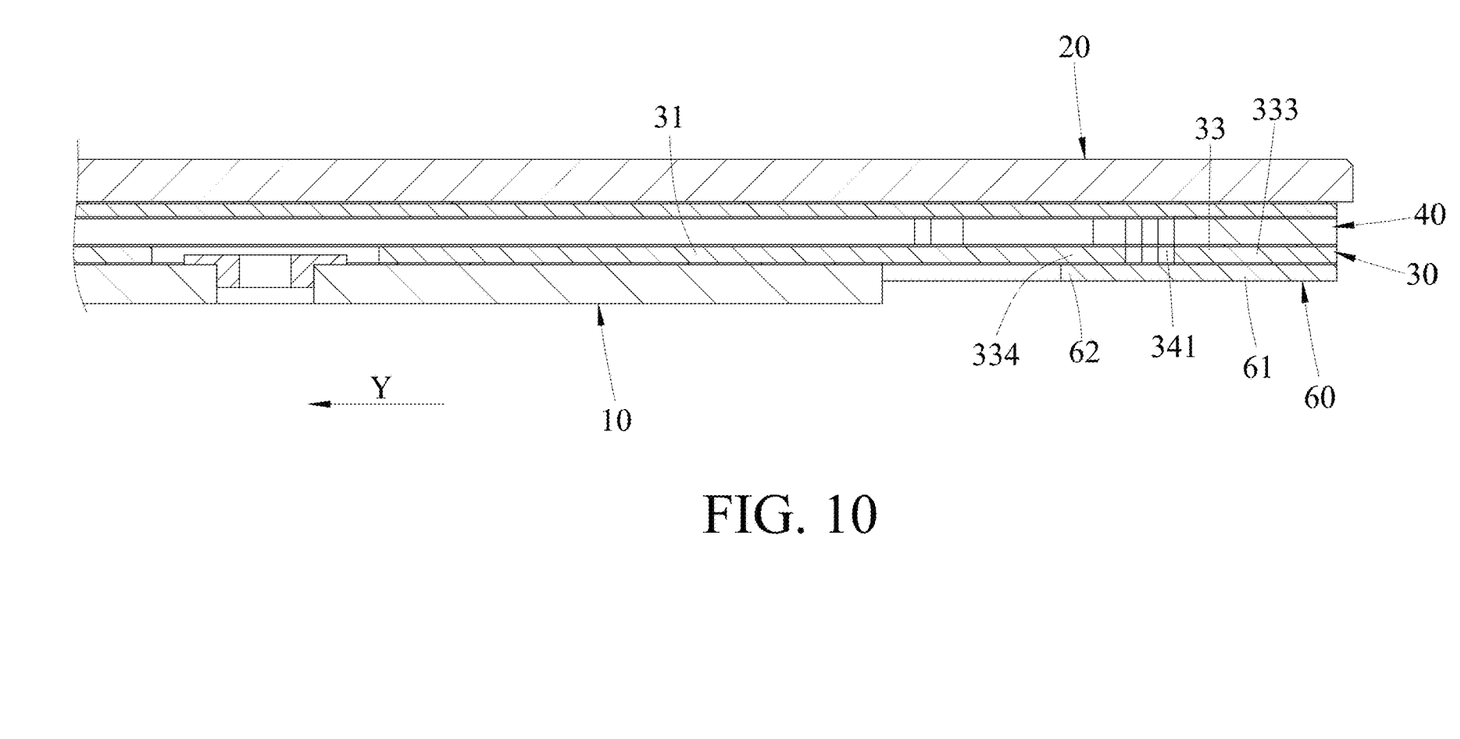
FIG. 10 is a fragmentary enlarged view of FIG. 9.

Referring to FIGS. 1 and 4 to 10, the touch unit 20 is disposed on the resilient unit 30, and the resilient unit 30 supports the touch unit 20 with an upward resilient force thereof, which is enough to cause the first frame rods 331, the second frame rods 332 and the positioning region 31 to stay at the same height along the axis (L) (see FIGS. 8 and 10). At this time, the touch unit 20 is at an initial position, the pushbutton switch 23 is not triggered to generate a signal. In addition, free ends of the supporting members 62 connected to the longitudinal frame plates 612 support a bottom surface of the positioning region 31 (only one supporting member 62 is shown in FIG. 8), and free ends of the supporting members 62 connected to the horizontal frame plates 611 correspondingly support bottom surfaces of the inner resilient arms 334 (only one supporting member 62 and one inner resilient arm 334 are shown in FIG. 10).

Figure 11:
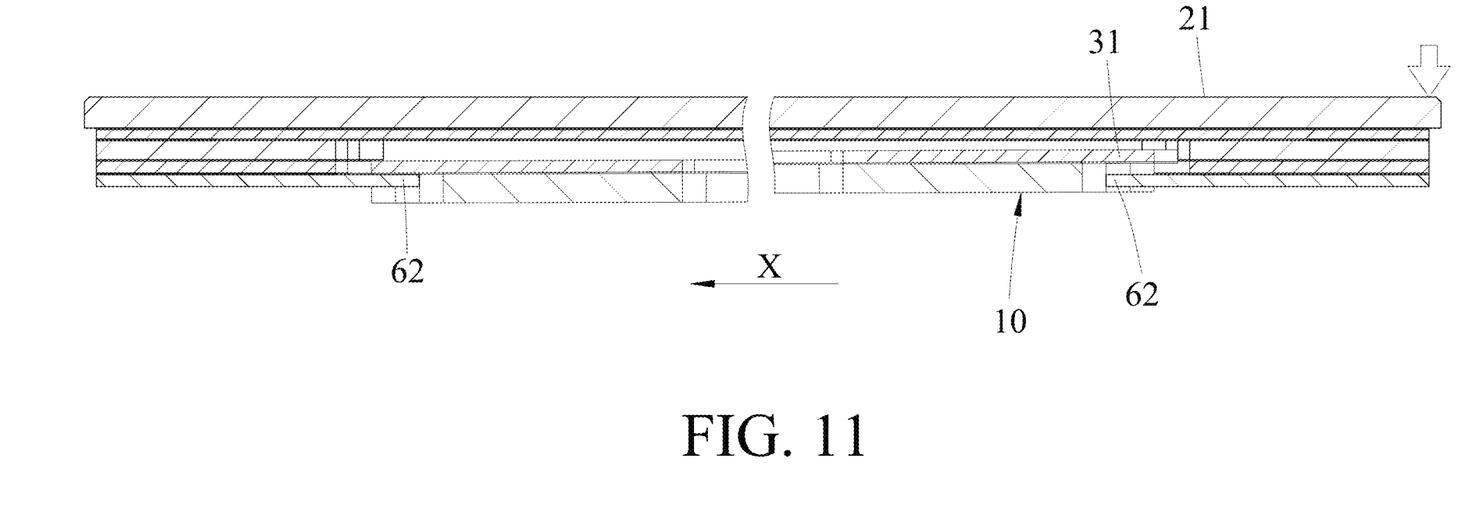
FIG. 11 is a fragmentary schematic sectional view illustrating that one side of a touch unit of the embodiment is being pressed.

As shown in FIG. 11, when a downward force (indicated by the arrow) is exerted on a portion of the touch pad 21 (e.g., one of edges and corners of the touch pad 21) toward the bottom plate 10, the portion of the touch pad 21 inclines, causes a part of the free ends of the supporting members 62 that are connected to the longitudinal frame plates 612 to move away from the bottom surface of the positioning region 31, and causes a part of the free ends of the supporting members 62 that are connected to the horizontal frame plates 611 to move away from the bottom surfaces of the inner resilient arms 334 (not shown in FIG. 11), and the touch unit 20 drives the connecting frame subunit 33 to move downward; the free ends of the remaining supporting members 62 not affected by the portion of the touch pad 21 support the bottom surface of the positioning region 31 and the bottom surfaces of the inner resilient arms 334. Furthermore, the connecting frame subunit 33 is able to resiliently move with respect to the positioning region 31 due to configuration of the slot region 34. That is to say, when the touch pad 21 is pressed toward the bottom plate 10, the connecting frame subunit 33 is pushed by the touch unit 20 such that the resilient unit 30 is resiliently deformed and that the connecting frame subunit 33 is bent relative to the positioning region 31. At this time, the pushbutton switch 23 is triggered to generate a signal when driven by the circuit board 22 to move with respect to the bottom plate 10 and thus to be abutted by the pressing member 50. When the downward force is released, the touch pad 21 and the supporting members 62 restore to initial positions through a resilient force of the resilient unit 30 as shown in FIGS. 7 to 10.

Figure 12:
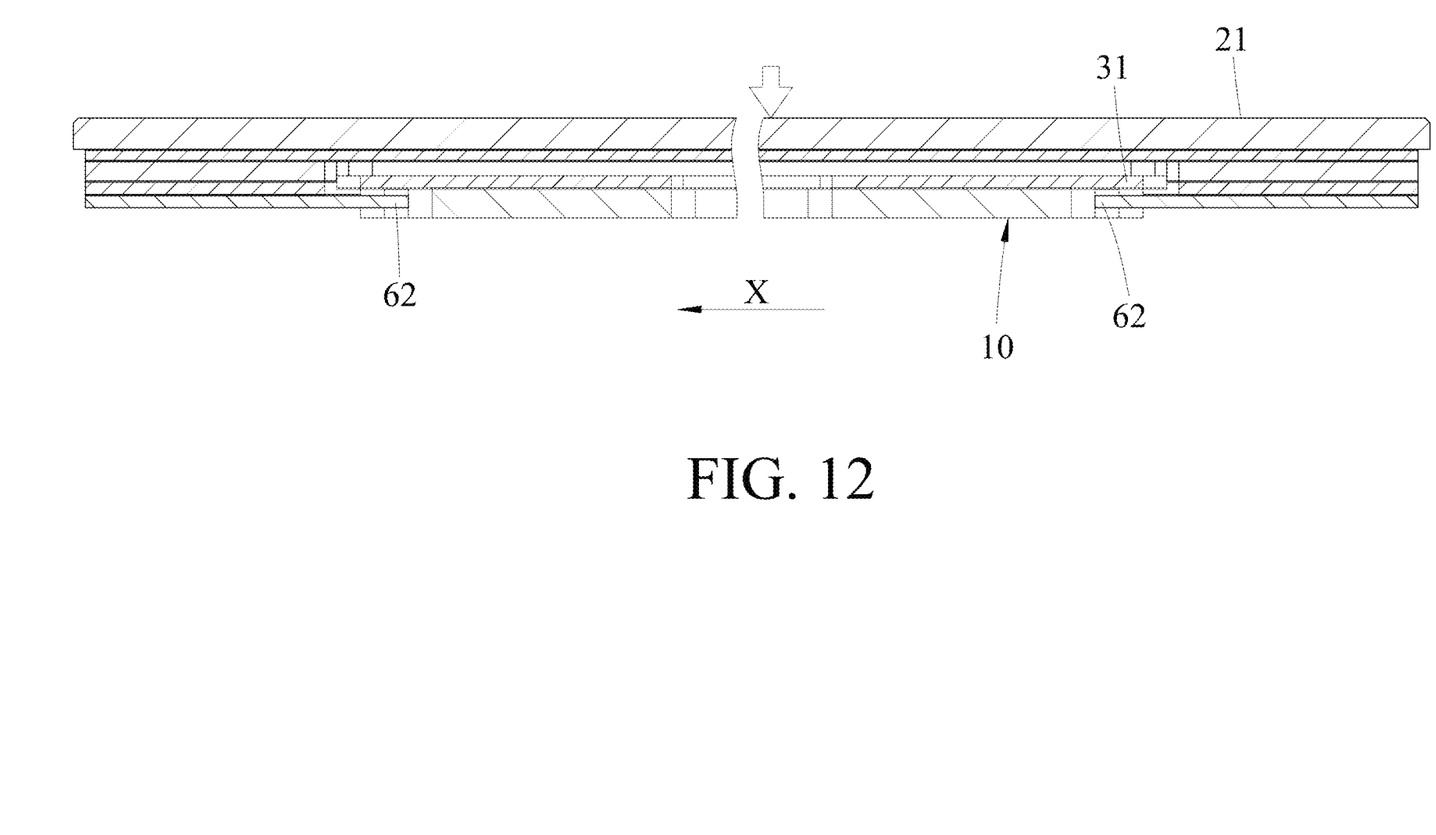
FIG. 12 is a fragmentary schematic sectional view illustrating that a center of the touch unit is being pressed.

As shown in FIG. 12, when a downward force (indicated by the arrow) is exerted on a center of the touch pad 21 toward the bottom plate 10, the touch pad 21 moves downward, and drives the free ends of the supporting members 62 to move away from the bottom surface of the positioning region 31 and the bottom surfaces of the inner resilient arms 334 (only two of the supporting members 62 moving away from the bottom surface of the positioning region 31 is shown). Moreover, the connecting frame subunit 33 is able to resiliently move with respect to the positioning region 31 due to the configuration of the slot region 34. At this time, the pushbutton switch 23 is triggered to generate the signal when driven by the circuit board 22 to move with respect to the bottom plate 10 and thus to be abutted by the pressing member 50. When the downward force is released, the touch pad 21 and the supporting members 62 restore to the initial positions through the resilient force of the resilient unit 30 as shown in FIGS. 7 to 10.

Therefore, the effects generated by the present disclosure can be summarized as follows.

1. Except for the bottom plate 10 being made of a metal material, other components of the disclosure can be made of a lightweight material (e.g., thin stainless steel, glass fiber, carbon fiber, plastic), and all components of the disclosure are bonded to each other through adhesives. Thus, an overall weight of the disclosure is lighter than the conventional touch pad module, and a weight of the abovementioned lightweight material is about 20% of a weight of a metal material.
2. The touch unit 20 has an enough structural strength, so it will not deform due to the structural relationship of the resilient unit 30 and other components and be not able to be pressed.
3. Shapes and structures of the resilient unit 30, the abutting plate 40 and the supporting unit 60 are simple and easy to be manufactured, and thus manufacturing cost of the disclosure can be reduced as well.
4. A magnitude of the downward force to trigger the pushbutton switch 23 is adjustable by modifying the widths and the thicknesses of the spacer sections 346 or the outer resilient arms 333, so as to meet actual needs.

In summary, the full-area touch device of this disclosure has a simple structure and is easy to be manufactured and assembled, so the object of this disclosure can indeed be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A full-area touch device, comprising:
    a bottom plate including a bottom plate periphery;
    a touch unit disposed above said bottom plate along an axis, and including a touch pad, a circuit board that is connected to a bottom side of said touch pad, and a pushbutton switch that is disposed on a bottom side of said circuit board;
    a resilient unit in a shape of a plate, disposed between said bottom plate and said circuit board, and including a positioning region that is connected to said bottom plate, a peripheral edge that surrounds a periphery of said positioning region, a connecting frame subunit that is disposed between said positioning region and said peripheral edge, and a slot region that is located between said positioning region and said peripheral edge, said slot region having a contour that is greater than a contour of said bottom plate periphery, said slot region surrounding said positioning region, said connecting frame subunit being in a shape of a surrounding frame and being positioned with respect to said circuit board, wherein, when said touch unit is pressed toward said bottom plate, said connecting frame subunit being pushed by said touch unit such that said resilient unit is resiliently deformed and that said connecting frame subunit is bent relative to said positioning region; and
    a supporting unit in a shape of a surrounding frame, connected to said resilient unit and positioned with respect to said circuit board, and including a fixing frame subunit that is connected to said connecting frame subunit, and a plurality of supporting members that are connected to said fixing frame subunit, each of said supporting members extending across said slot region.

2. The full-area touch device as claimed in claim 1, wherein said peripheral edge of said resilient unit has two first lateral sides, and two second lateral sides each of which interconnects said first lateral sides, said connecting frame subunit having two first frame rods which are respectively adjacent to said first lateral sides, and two second frame rods which are respectively adjacent to said second lateral sides and each of which interconnects said first frame rods, said slot region having two outer horizontal slot subregions that are respectively located on said first frame rods, two inner horizontal slot subregions that are located between said outer horizontal slot subregions, and two longitudinal slot subregions each of which is located between said positioning region and a respective one of said second frame rods, each of said outer horizontal slot subregions having at least one outer horizontal slot that extends in a horizontal direction, each of said inner horizontal slot subregions having a plurality of inner horizontal slots that are spaced apart from each other in the horizontal direction, each of said longitudinal slot subregions being in spatial communication with one of said inner horizontal slots of each of said inner horizontal slot subregions, said positioning region being surrounded by said inner horizontal slots and said longitudinal slot subregions, each of said supporting members of said supporting unit extending across one of said outer horizontal slot subregions and said longitudinal slot subregions.

3. The full-area touch device as claimed in claim 2, further comprising an abutting plate that is disposed between said circuit board and said resilient unit, and that includes a positioning frame clamped between said circuit board and said connecting frame subunit, and a plurality of abutting members connected to said positioning frame and abutting against said first frame rods.

4. The full-area touch device as claimed in claim 2, wherein said at least one outer horizontal slot of each of said outer horizontal slot subregions of said slot region has two slot ends that are respectively adjacent to said second frame rods and that are in spatial communication with each other, said slot region further including a plurality of spacer sections which are connected to said positioning region and each of which is formed between two adjacent ones of said inner horizontal slots of said inner horizontal slot subregions.

5. The full-area touch device as claimed in claim 4, wherein each of said spacer sections of said slot region of said resilient unit has a width that ranges from 3 millimeters to 10 millimeters in the horizontal direction and a thickness that ranges from 0.3 millimeters to 0.8 millimeters.

6. The full-area touch device as claimed in claim 2, wherein
    each of said first frame rods of said resilient unit has an outer resilient arm that is located between the respective one of said first lateral sides and the respective one of said outer horizontal slot subregions, and an inner resilient arm that is located between the respective one of said outer horizontal slot subregions and a respective one of said inner horizontal slot subregions, and
    said outer resilient arm of each of said first frame rods has a width that ranges from 3 millimeters to 12 millimeters in a longitudinal direction perpendicular to the horizontal direction, and a thickness that ranges from 0.3 millimeters to 0.8 millimeters.

7. The full-area touch device as claimed in claim 1, further comprising a pressing member that is disposed on said resilient unit and that corresponds in position to said push-button switch.

8. The full-area touch device as claimed in claim 1, wherein said bottom plate is made of a metal material, and said resilient unit is made of one of a plastic material, a metal material, a glass fiber material, and a carbon fiber material.

9. The full-area touch device as claimed in claim 1, wherein said fixing frame subunit of said supporting unit includes two horizontal frame plates that extend in the horizontal direction, and two longitudinal frame plates that extend in a longitudinal direction perpendicular to the horizontal direction, said supporting members being connected to said horizontal frame plates and said longitudinal frame plates.

10. The full-area touch device as claimed in claim 9, wherein said horizontal frame plates and said longitudinal frame plates are separately formed.

\* \* \* \* \*